(12) United States Patent
Dutton et al.

(10) Patent No.: US 9,745,007 B2
(45) Date of Patent: Aug. 29, 2017

(54) FENDER MIRROR MOUNT (71) Applicant: Elkhart Brass Manufacturing Company, Inc., Elkhart, IN (US)

(72) Inventors: Christopher M. Dutton, Goshen, IN (US); Daniel L. Cook, Elkhart, IN (US)

(73) Assignee: Elkhart Brass Manufacturing Company, Inc., Elkhart, IN (US)

( * ) Notice: Subject to any disclaimer, the term of this patent is extended or adjusted under 35 U.S.C. 154(b) by 0 days.

(21) Appl. No.: 15/297,283

(22) Filed: Oct. 19, 2016

(65) Prior Publication Data

US 2017/0036719 A1 Feb. 9, 2017

Related U.S. Application Data

(60) Continuation of application No. 14/881,504, filed on Oct. 13, 2015, now Pat. No. 9,499,101, which is a division of application No. 14/254,351, filed on Apr. 16, 2014, now Pat. No. 9,180,816.

(60) Provisional application No. 61/817,049, filed on Apr. 29, 2013.

(51) Int. Cl.
| | |
|---|---|
| *A47G 1/16* | (2006.01) |
| *B62D 65/02* | (2006.01) |
| *B60R 1/06* | (2006.01) |
| *B60R 1/04* | (2006.01) |

(52) U.S. Cl.
CPC .............. *B62D 65/024* (2013.01); *B60R 1/04* (2013.01); *B60R 1/06* (2013.01)

(58) Field of Classification Search
CPC ........... B60R 1/04; B60R 1/06; B60R 1/0605; B62D 65/024
See application file for complete search history.

(56) References Cited

U.S. PATENT DOCUMENTS

| | | | |
|---|---|---|---|
| 2,678,150 | A | 5/1954 | Lund |
| 4,105,296 | A | 8/1978 | Tomlin |
| 4,500,063 | A | 2/1985 | Schmidt et al. |
| 4,512,634 | A | 4/1985 | Stout |
| 4,938,578 | A | 7/1990 | Schmidt et al. |
| 4,991,814 | A | 2/1991 | Schmidt et al. |
| 5,106,049 | A | 4/1992 | Schmidt et al. |

(Continued)

FOREIGN PATENT DOCUMENTS

DE   102010056189   8/2011

*Primary Examiner* — Amy Sterling
(74) *Attorney, Agent, or Firm* — Warner Norcross and Judd LLP (57) ABSTRACT

A mirror mount that mounts a mirror to a vehicle fender. The mount can include a base that faces a vehicle fender exterior without extending upwardly and under a hood of the vehicle. A support arm extends from the base and includes a distal end that joins with a mirror. One or more pillars extend away from the base. The pillars can be sized and shaped to extend through holes in the fender to a frame member of the vehicle disposed inwardly relative to the fender. The pillars are associated with a fastener to join with the frame member so that weight of the mirror, the base, the support arm and/or the pillars are substantially born by the frame member. This can reduce transmission of vibration inherent in the fender to the mirror, and/or can rigidly and structurally connect the mirror to the frame member, rather than the fender.

20 Claims, 8 Drawing Sheets

(56) References Cited

U.S. PATENT DOCUMENTS

| | | | |
|---|---|---|---|
| 5,116,013 A * | 5/1992 | Malcolmson | B60R 1/0605 |
| | | | 248/484 |
| 5,433,417 A * | 7/1995 | Schmidt | B60R 1/002 |
| | | | 248/316.5 |
| 5,483,385 A | 1/1996 | Boddy | |
| 5,769,379 A | 6/1998 | Englander et al. | |
| 5,870,236 A | 2/1999 | Barksdale | |
| 6,202,975 B1 | 3/2001 | Schmidt | |
| 6,220,716 B1 | 4/2001 | Asaka | |
| 6,239,928 B1 | 5/2001 | Whitehead | |
| 6,276,805 B1 | 8/2001 | Home et al. | |
| 6,293,679 B1 | 9/2001 | Schmidt et al. | |
| 7,055,973 B2 | 6/2006 | Englander | |
| 7,699,285 B2 | 4/2010 | Brancaleone et al. | |
| 8,495,792 B2 | 7/2013 | Atwell | |
| 8,517,331 B2 | 8/2013 | Roberts | |
| 8,807,510 B2 | 8/2014 | Sugisaka et al. | |
| 9,221,398 B1 * | 12/2015 | Englander | B60R 1/078 |
| 2010/0226026 A1 * | 9/2010 | Englander | B60R 1/0605 |
| | | | 359/841 |
| 2011/0267466 A1 | 11/2011 | Brester | |
| 2011/0284715 A1 | 11/2011 | Roberts et al. | |

* cited by examiner

FENDER MIRROR MOUNT

BACKGROUND OF THE INVENTION

The present invention relates to a mirror mount, and more particularly to a mirror mount that mounts a mirror to a fender of a vehicle.

There are a variety of vehicles, such as buses, shuttles and trucks, that have one or more fender mounted mirrors. These mirrors provide a rearward viewing perspective to an operator of the vehicle.

Most mirrors are mounted with mirror mounts including multiple support arms that are secured directly to a fender exterior of vehicle. Some mirror mounts, however, include a bracket that follows the contour of an outer surface of the fender. That bracket is strapped or screwed at a lower end directly to the outer fender exterior or "skin". The bracket of these mounts includes a Z-shaped secondary bracket that extends from an upper end of the main bracket, across the top of the fender, and through a gap between the fender and hood of the vehicle. The Z-shaped secondary bracket is screwed to the bulkhead of the vehicle immediately under the edge of the hood.

While such constructions can reduce some vibration in the mirror transmitted through the typical thin outer fender skin, the fact that the bracket rests on and is supported by the fender skin can decrease the effectiveness of the vibration attenuation. This is because the bracket is still partially supported by the fender skin. Thus, an operator's view through the mirror still may appear blurry because the mirror vibrates. Parts of the mirror and the fender also can crack due to the vibration. Finally, these types of mirror mounts can be rather large, and can occupy valuable viewing space.

SUMMARY OF THE INVENTION

A mirror mount is provided to join a mirror with a fender of a vehicle. In one embodiment, the mount can include a base that faces a vehicle exterior fender without extending upwardly and under a hood of the vehicle. A support arm can extend from the base and can include a distal end that joins with a mirror. One or more pillars can extend away from the base.

In another embodiment, the pillars can be sized and shaped to extend through holes defined in the exterior fender to a frame member of the vehicle disposed inwardly relative to the fender. The pillars can be associated with respective fasteners to join with the frame member. Optionally, the pillars can be rigidly and non-rotatably joined with the base. The pillars can also remain unjoined with the exterior fender, and generally can be unsupported by the same.

In even another embodiment, the pillars can include a first end joined with the base and a second end separated from the first end by a distance. That distance can be substantially equal to the distance defined between the fender and the frame member. With this construction, the pillars and base can be secured to the frame member with the base optionally slightly clampingly engaging the exterior fender; but not being supported thereby. The pillars, rather than the exterior fender can support the base, the support arm and mirror.

In still another embodiment, the pillars can include a shoulder configured to engage and contact the frame member. A fastener can project from the second end adjacent the shoulder. Optionally, the fastener extends through the frame member, and can be joined with a nut that further fastens the fastener and the pillars to the frame member.

In yet another embodiment, the mirror mount pillars can define a bore. One or more independent and separate fasteners can be installed in the bore. Those fasteners can extend beyond the second end. A portion of the fasteners extending beyond the end can extend through the frame member to secure the pillars and base to the frame member.

In a further embodiment, the mirror mount can include a support block. The pillars can form a part of the support block. The support block can be sized and shaped for positioning between an inner surface of the exterior fender and the frame member. Optionally, the block and/or pillars can define one or more bores, and fasteners can extend through those bores and through the frame member.

The present invention provides a mirror mount that can transmit weight of a mirror, base, support arm and/or pillars directly to a frame member, optionally rather than the fender. This can reduce transmission of vibration inherent in the fender to the mirror, and can add structural rigidity to the mounted mirror because it mounts directly to and is supported primarily by a rigid structural part, that is, the frame member, rather than a flimsy exterior fender.

These and other objects, advantages, and features of the invention will be more fully understood and appreciated by reference to the description of the current embodiments and the drawings.

Before the embodiments are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

DETAILED DESCRIPTION OF THE CURRENT EMBODIMENTS

A mirror mount of a current embodiment is illustrated in FIGS. 1-5 and generally designated 10. The mirror mount 10 can be included in a mirror assembly 11 which includes a mirror 12. As illustrated, the mirror mount and assembly are configured with particular sizes, shapes and geometric configurations to conform to a particular fender and its contours, depending on the vehicle and the particular fender, these features can vary as desired. Although shown in connection with a van or bus fender, the mirror mount and assembly herein can be used in connection with a variety of different vehicular fender applications, including but not limited to those on light cars and trucks, heavy trucks, shuttles, industrial equipment, agricultural equipment and other mobile machinery. Further, the mirror mount and mirror assembly are used in conjunction with one or more of the front fenders of a vehicle. Although shown in conjunction with the passenger side fender, the mirror mount 10 and assembly 4 can be used on the opposite, driver's side as well. Additionally, the particular location of the mounting can vary somewhat, again depending on the vehicle and fender configurations.

Figure 1:
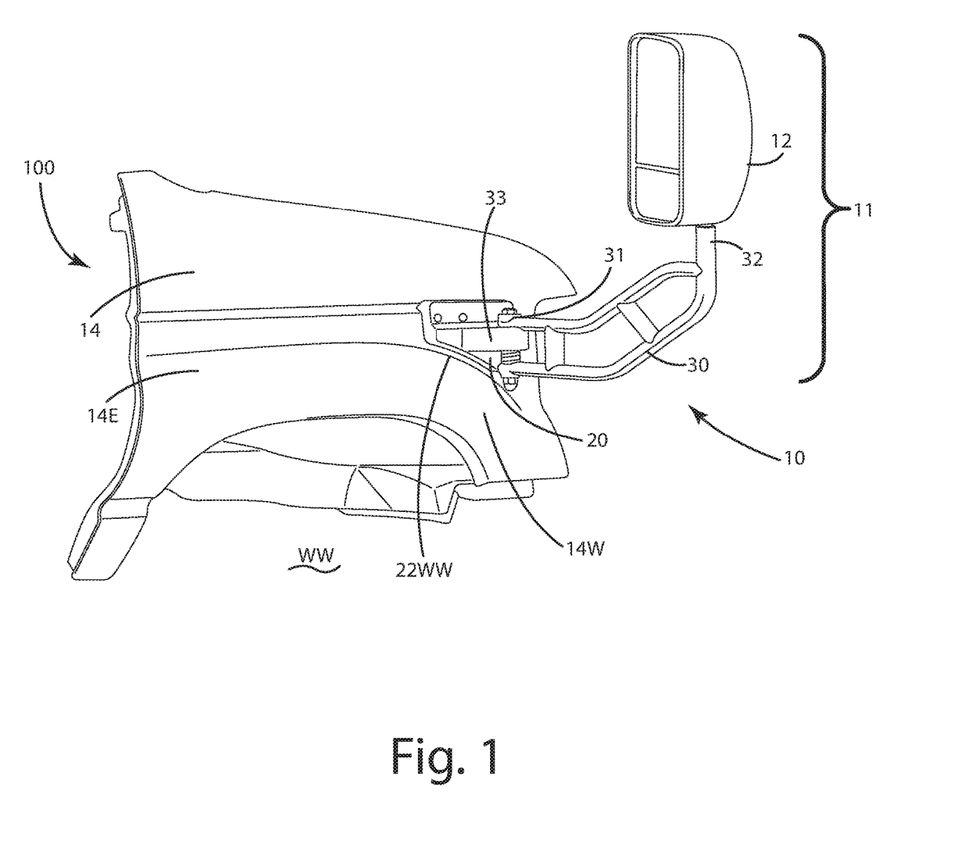
FIG. 1 is a rear perspective view of a mirror mount of a current embodiment mounted to a fender.
Figure 3:
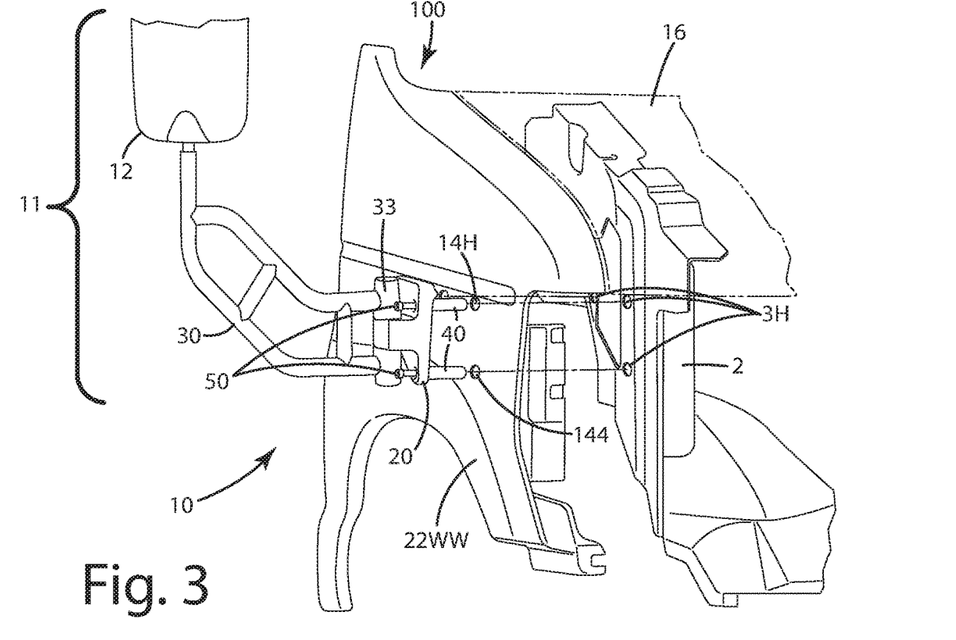
FIG. 3 is an exploded view of the mirror mount as it is mounted to the fender.

As shown in FIGS. 1 and 3, the mirror mount 10 includes a base 20, to which a support arm 30 is joined. The support arm 30 is further joined with a mirror 12. The base includes one or more pillars 40 that extend inwardly from the base 20. The pillars can be joined with and/or include fasteners 50. The pillars can pass through the fender and effectively mount the base 20, and the mirror mount 10 in general, directly to a frame member 2 of the vehicle 100.

Figure 5:
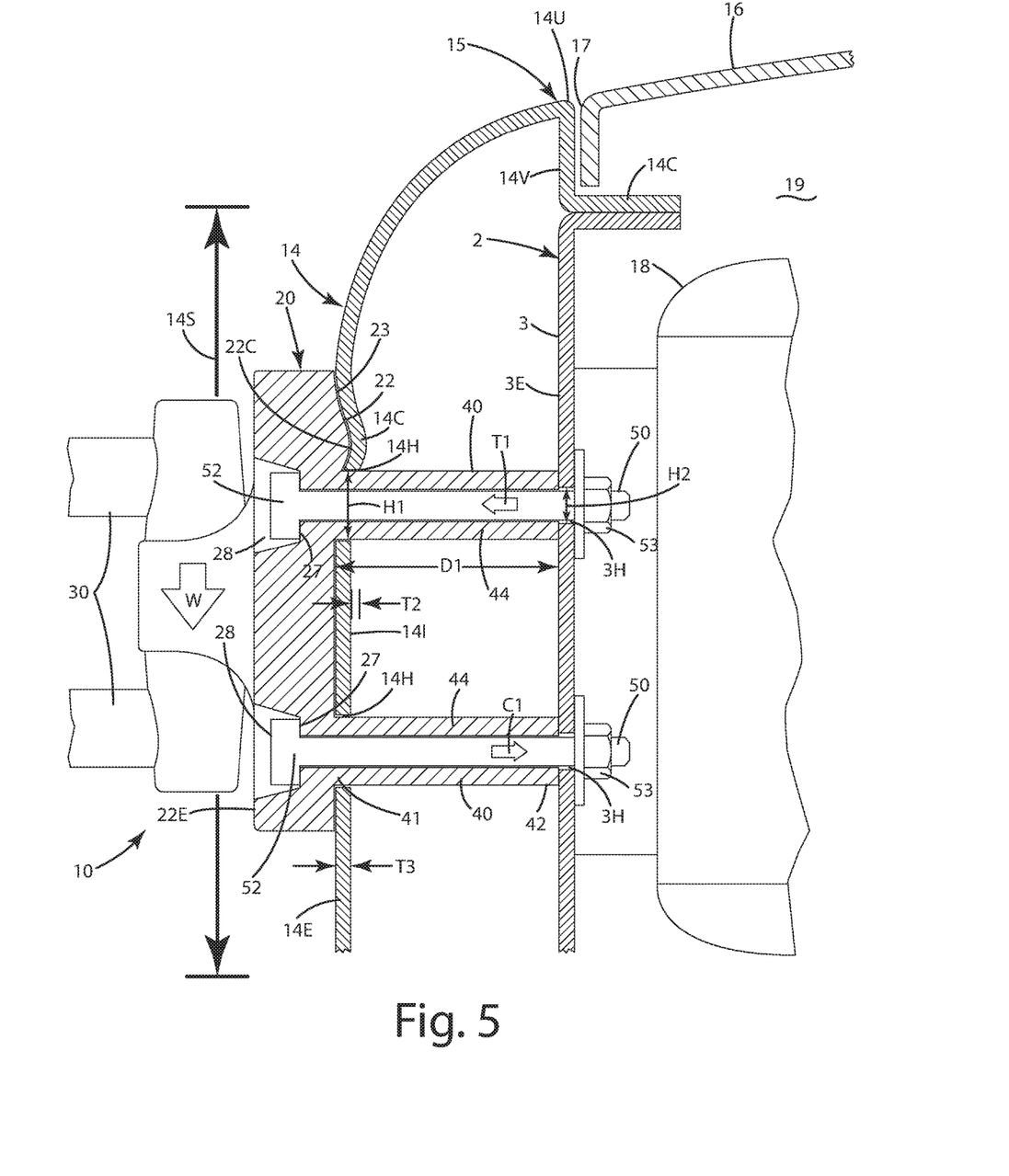
FIG. 5 is a partial section view of the mirror mount mounted to the fender.

As shown in FIGS. 1 and 5, the fender 14 of the vehicle can include an exterior side surface 14E and in opposing interior side surface 14I. Generally, the interior side surface 14I is concealed from view. Likewise the outer wall 3 of the frame member 2 also can be concealed from view. The fender also includes an uppermost portion 15 which generally is the highest portion of the fender along any given cross section of the fender. The uppermost portion 15 generally transitions to the vertical portion 14V at the fender upper edge 14U. This upper edge 14U is also generally positioned immediately adjacent the hood edge 17 when the hood 16 is closed. Adjacent the uppermost portion 15, the fender 14 transitions to a connection flange 14C, optionally via the vertical portion 14V. This connection flange 14C is connected to an inner fender or a frame, also referred to as a frame member 2 herein. This frame member can form a portion of the bulkhead and/or the engine bay.

The fender 14 can be configured to transition to the hood 16 of the vehicle 100. The hood 16 includes a hood edge 17 that is positioned adjacent the uppermost portion 15 of the fender 14 and extends adjacent a concealed vertical portion 14V of the fender. The fender 14 also includes a fender side 14S which is located below the uppermost portion 15.

The vehicle can be structured so that the frame 2 includes frame outer wall 3. Of course in certain constructions, depending on the vehicle, additional walls can be included in the fence. Generally, the frame member or inner fender provides the structural support to the fender 14, which also can be referred to as an outer fender or fender skin. The frame member 2 can also support other items on the interior of the engine bay, for example, the air conditioning compressor 18. This air conditioning air compressor 18 can be fastened, bolted or otherwise joined with the frame member 2.

The fender 14 and frame 2 can be modified to accommodate the mirror mount 10 of the current embodiment. Specifically, the fender 14 and in particular the fender side 14S can be predrilled with a conventional drill to define holes 14H therein. When so drilled, the holes usually are of a circular shape. Likewise, the frame member 2 can be drilled to define holes 3H. These holes can be of the same size or of different sizes, and can be drilled by the same drill bit or different size drill bits. For example, the outer holes 14H can be of a first hole diameter H1 while the frame holes 3H can be of a second hole diameter H2. The second hole diameter H2 can be less than or smaller than the first diameter H1. With these optional different sized holes in the fender and frame, the pillars 140 can fit through the larger diametered holes 14H in the fender 14, yet abut against the frame outer wall 3 and in particular the frame exterior surface 3E, without projecting through the holes 3H. The fastener 50 can extend through the smaller holes 3H as described in more detail below, optionally without being threaded directly to those holes on the frame, as would be the case for example, with a self-tapping fastener.

As mentioned above, the mirror mount 10 includes a base 20. With reference to FIGS. 1 and 5, the base 20 can include an inner surface 22. Optionally the inner surface 22 can include a contact element 23 which can be disposed between the base 20 and the exterior 14E of the fender 14. The contact element can be in the form of a cushion, such as a piece of rubber, elastomeric or other soft material to prevent scratching of the paint surface or damage to the fender via contact of the base 20 with the fender 14. Of course, the base 20 can be painted or coated with a non-abrasive paint or coating to provide the same effect if desired. Further, the contact element can be absent altogether from the mirror mount if desired.

The inner surface 22 of the base 20 can include an interior contour that follows the contours of the exterior surface 14E of the fender 14. The base 20 can be constructed so that the inner surface 22 engages substantially only the side surface 14S of the exterior 14E of the fender 14. In some cases, the fender 14 can include a particular indented or U-shaped contour 14C. Accordingly, the base 20 can include a corresponding projection 22C which is configured to fit within the contour or groove 14C. This can enable the base 20 to positively register with the fender, and particular physical contours of the fender, in a desired location along the exterior 14E.

The base 20 and the mirror mount 10 can be specifically configured so that they include no parts that extend upwardly over the fender upper edge 14U or otherwise into the engine bay 19 of the vehicle. Generally, the base and pillars can extend substantially only along the side surface 14S of the fender, and can terminate short of the upper edge 14U; hood 16 and engine bay 19. Optionally, the base can contact substantially only the side surface 14S and exterior surface 14E (including any contours 22C), without contacting or engaging other portions of the fender, such as the uppermost portion 14U and/or the other portions 14V and 14C.

The mirror 12 and support arm 30, can extend upward alongside the fender 14. Further, the base 20 and mirror mount 10 can be configured and sized so that they do not extend in any way adjacent the edge 17 of the hood, or higher than the uppermost portion 15 of the fender 14. The base 20 and mirror mount 10 can mount substantially entirely only on the side surface 14S of the fender 14.

Optionally, the base 20 can be configured to include a wheel well contour 22WW. This contour 22WW is specifically configured to accommodate an outer bulge in the fender 14 at the wheel well 14W. Generally the wheel well contour is of a concave shape as shown in FIG. 1 and follows the wheel well contour 14W. Further, the mirror mount 10 can be configured so that it is positioned above the forward-most portion of the wheel well WW of the vehicle 100. This can position that mirror in a forward-most location to improve viewing of the mirror by the operator. Of course, in some applications, the wheel well contour 22WW can be removed or changed, and the base or mirror mount 10 can be mounted farther back over the wheel well or even behind the wheel well in some applications. In some applications, the base can overlap the wheel well contour 22WW, in which case, it can include an inner contour that conforms to the wheel well contour 22WW.

The base 20 of the mirror mount 10 can be constructed to include or be joined with a support arm 30. The support arm 30 can be of a multi-bar construction as shown. Alternatively, it can include a single arm. The support arm can include a proximal end 31 and a distal end 32. The distal end 32 is joined with a mirror 12. At the point of attachment of the distal end 32 to the mirror 12, a rotational element or swivel (not shown) can be included. That swivel can allow the mirror 12 to swivel relative to the support arm 30. The mirror can be any type of conventional mirror, and can include multiple different types of mirror surfaces.

The proximal end 31 of the support arm 30 can be joined with the base 20 via a mounting element 33. This mounting element 33 can include a pivoting structure such as bushings, a tube within a tube, and/or some other pivoting mechanism that allows the support arm 30, and thus the mirror 12, to move and optionally rotate relative to the base 20 and the fender 14 and/or vehicle 100. Further optionally, the mounting element 33 can include a breakaway mechanism so that it holds the support arm 30 and mirror 12 in a generally fixed position, unless and until the mirror and/or support arm 30 encounters an object which will push the support arm rearward so that it and the mirror are not damaged. Of course, the mounting element alternatively can be void of such a breakaway mechanism if desired.

Figure 2:
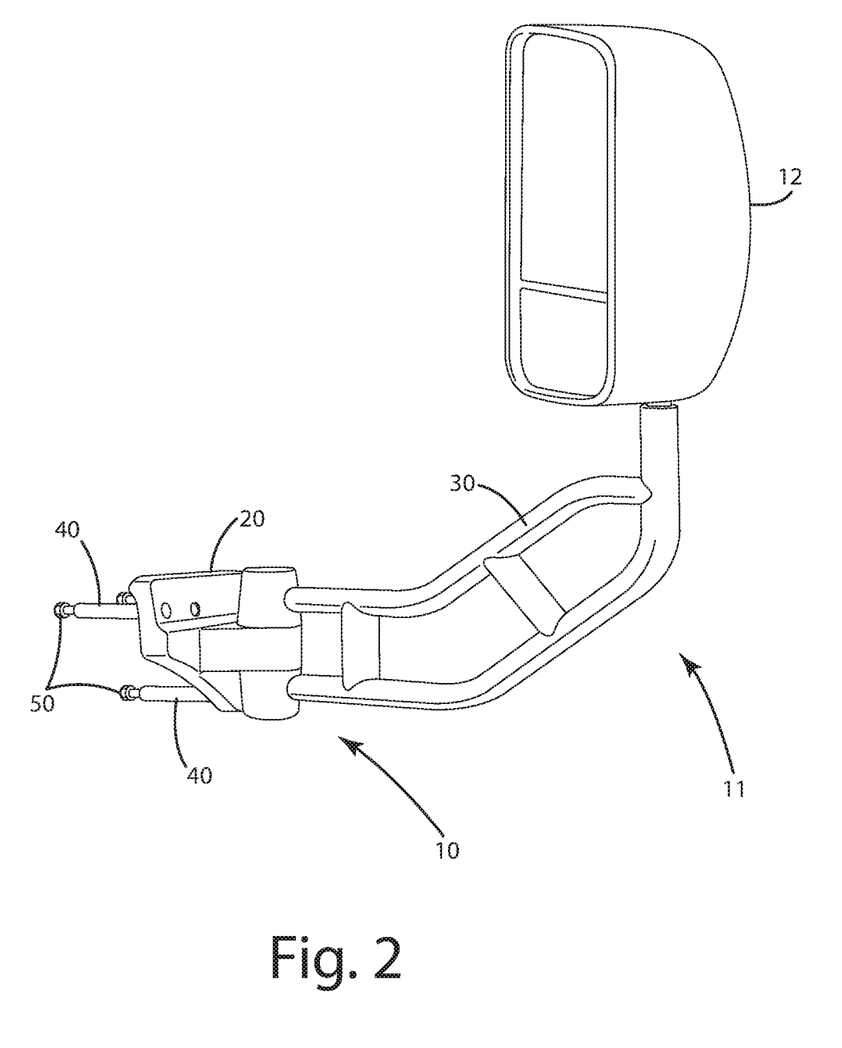
FIG. 2 is an enlarged rear perspective view of the mirror mount removed from the fender.

As shown for example in FIGS. 1, 2 and 3, the support arm 30 and mirror 12 can be joined substantially only with the mirror mount 10 to the fender 14. Optionally, the support arm 30 and mirror 12 include no other points of attachment other than through the mirror mount 10 and the base 20 to the fender of the vehicle. In this construction, the mirror mount 10 and mirror assembly 11 are completely void of any secondary support members or arms that join the mirror 12 or support arm 30 to the fender or vehicle.

As shown in FIGS. 2 and 5, the mirror mount 10, and in particular the base 20, include pillars 40. The pillars can extend from the base inner surface contour 22 which is generally opposite the exterior 22E of the base 20. The pillars can be integrally formed with the base 20 as a monolithic, single piece structure. Optionally, the base and pillars can be formed from a single piece of molded metal, plastic, composite or other material. The pillars 40 can be rigidly and non-rotatably joined to the base 20.

The pillars can be of a substantially cylindrical shape, which optionally can be slightly tapered from the end closest to the base, that is, a first end 41, to a second end 42 (FIG. 5). The pillars 40 of course can be of another geometric shape, for example, of a cross section that is triangular, square, rectangular, oval or other shapes. The tapered cylindrical shape of the pillars, however, having a generally circular cross section, can be easily fit through the predrilled holes 14H in the fender. These predrilled holes 14H can be created with a rotary style drill and can be of a generally circular shape as mentioned above.

The pillars 40 alternatively can be constructed to be non-integrally joined with the base 20. For example, they could be separate tubes (not shown) that include a threaded end and thread directly into the base 20. Further alternatively, the pillars 40 can be constructed to simply be in the form of fasteners extending from the base 20 as described further below in an alternative embodiment.

As shown in FIGS. 2 and 3, there can be multiple pillars, for example, three pillars 40 associated with the base 20. This creates a generally triangular connection between the base 20 directly to the frame member 2. Although shown as only being three pillars, more or fewer pillars can be utilized depending on the precise construction. For example, one pillar can be used in certain circumstances provided that the pillar is substantially structurally strong enough to support the mirror mount, and able to withstand rotational forces. More pillars can be used with particularly heavy mirrors.

With reference to FIG. 5, the pillars 40 again include a first end 41 adjacent the base and a second end distal 42 distal from the first end 41. The second end 42 can be configured to abut against and/or engage the frame 2, for example, the exterior surface 3E of the outer wall 3. In most cases, this surface 3E can be an upright, substantially vertical wall. The second end 42 can be positioned flush against this outer upright surface of the frame member 2. The second end 42 can be of a flattened or planar configuration so that it engages the outer upright surface of the frame member 2. In some cases, where the frame member 2 or an outer wall 3 is slightly contoured or has undulations or projections from it, the second end 42 of one or more of the pillars 40 can be configured to specially conform to those surface features.

As shown in FIG. 5, the pillars 40 can establish a predetermined distance D1 between the upright surface of the outer wall 3 and/or the frame member 2, and the base 20. This distance D1 can be selected so that when the base 20 and pillars 40 are fastened with the fasteners 50 to the frame member 2, the base 20 exerts a slight clamping force CF on the side surface 14S of the fender 14, and thereby provides a slight clamping effect on the exterior part of the fender, very slightly urging it toward the frame member 2. The clamping force CF can be optionally 0 pounds to about 5 pounds, or further optionally about 0.25 to about 2 pounds. Optionally, the distance D1 can be selected so that the clamping force CF does not crush, dent or permanently deform the fender in the location of the base 20 or elsewhere. In some cases, the clamping force CF can move the fender toward the frame a minor, preselected distance T2. This minor distance can be about 0.001 inches to about 0.05 inches, or other distances so that the fender is not dented or permanently deformed. Further optionally, the pillars can be sized and the predetermined distance D1 established so that there is no force exerted on the fender by the base 20. For example, the pillars 40 can be of a predetermined length equal to or greater than the distance between the inner fender surface 14I and the outer frame surface 3E, plus the thickness of T3 of the fender 14.

As shown in FIG. 5, each of the pillars 40 can be constructed to define a bore 44. This bore can be of a generally cylindrical construction or shape. Of course other geometrical shapes can be selected. The bore 44 can extend from the first end 41 to the second end 42 of the pillar and can enable a fastener 50 to be placed or positioned through that bore and extend beyond the second end 42. The bore 44 can be in communication with and can open to a recess 28 defined by the base 20. This recess 28 can be sized and shaped to accommodate an optional head 52 of a fastener 50. The recess 28 can be in the form or a shallow tapered well that is of the same geometric shape as the head 52. This can provide a locking mechanism for the head 52 to hold it in a fixed rotational orientation that is so that it does not rotate when a nut 53 is joined with the fastener. Optionally, the recess can be of a different shape and size larger than the head 52 so that a wrench can be fitted in the recess 28 to engage the fastener.

Generally, the pillars 40 can be constructed to engage the frame member 2, and for example, the outer wall 3 of the frame member, in such a way so that substantially all of the weight W of the base 20, the support arm 30 and the mirror 12 is transferred directly through the pillars to that frame member 2. Optionally, the weight of these components can create a moment M as shown in FIG. 5. This moment M created by the weight W can generate a tension T1 in the upper fasteners 50 and a compression force C1 in the lower fastener 50. Generally, the upper fasteners 50 are tensioned under the tension T1 and the lower fastener 50 is compressed under compression force C1. Of course, depending on the particular moment M, the weight of the components W, and other factors, such as the structure of the fender of the frame, these forces T1 and C1 can be altered.

As shown in FIGS. 2 and 5, the fasteners 50 can generally be in the form of bolts. Of course other types of fasteners can be used depending on the particular application. In some cases, the fasteners can be in the form of welded or cemented structures that are simply welded directly to the frame member 2 from the inside. Other structures for the fasteners also are contemplated.

As shown, the fasteners can extend from the base 20 through the bore 44 of the pillars 40. In turn, the fasteners 50 also extend through the holes 14H in the fender 14, without ever contacting the fender due to the pillar disposed between the fastener and the hole around the pillar. The fasteners also can extend and protrude beyond the second end 42 of the pillars 40. The fasteners can be of a sufficient length so that they extend through the holes 3H of the frame member 2. In this manner, the fasteners 50 can extend through the outer wall 3. As shown in FIG. 5, the fasteners 50 can be of a smaller dimension than the holes 14H and 3H, and can fit completely through all of those holes. The end of the pillars 42, however, can be sized to be smaller than the hole 14H and the fender 14, but sized larger than the hole 3H in the frame member 2 so that the second end 42 abuts the frame member 2 and can transmit forces directly to the frame member 2.

Each fastener 50 can include or be joined with a nut 53. The nut 53 can be tightened on the fastener 50 to tighten, secure and rigidly mount the base 20 directly to the frame member 2. Optionally, the fastener 50 can create at least part of the clamping force CF between the nut 53 and the head 52 of the fastener to draw the base 20 and the respective pillars against the frame member 2. Further optionally, when the fastener 50 is installed and/or tightened, the pillars 40 can limit the movement of the base 20 toward the frame member 2. For example, the base 20 may be restricted from moving any closer than distance D1 to the frame member 2, and in particular the outer wall 3. In effect, this restriction of the movement can enable the pillars to prevent or impair the fender 14 from being crushed, dented, and/or permanently deformed if the nut 53 is over-tightened.

Figure 4:
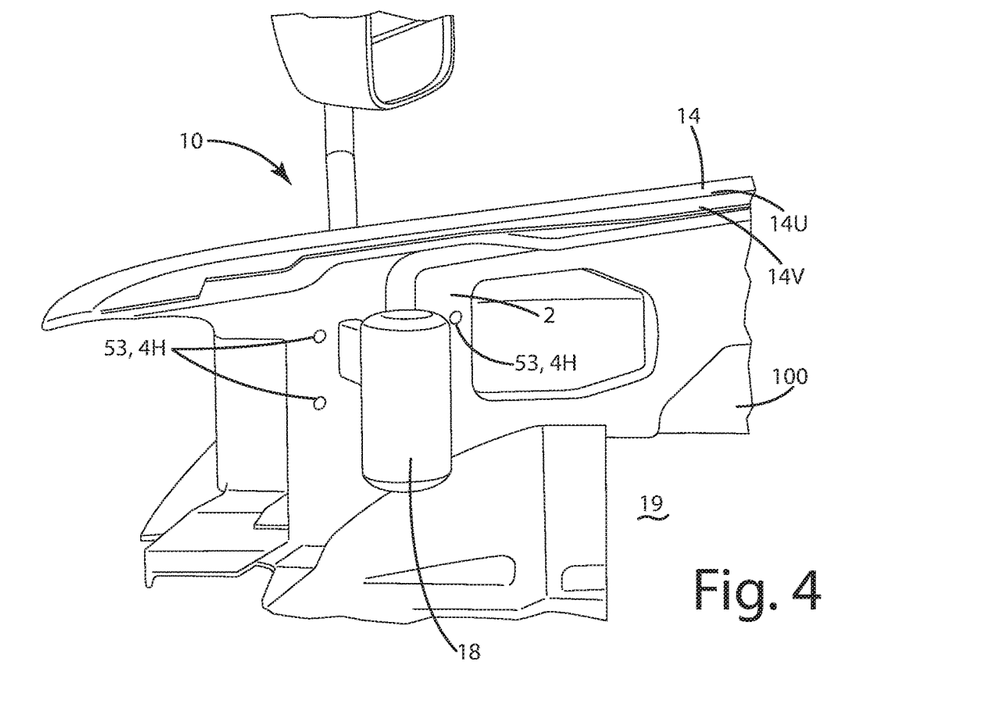
FIG. 4 is a view of the mirror mount mounted to the fender from a perspective inside the engine bay of the vehicle.

As mentioned above, the holes 14H and 3H can be predrilled in the respective fender and frame member. Holes 3H and the frame member can be drilled in locations that basically straddle a component within the engine bay 19. As shown in FIGS. 4 and 5, the holes 3H and respective nuts 53 can be positioned on and straddle opposing sides of an air conditioning tank 18 of the vehicle 100. With this construction and precise placement of these elements, an installer can easily and quickly install the mirror mount 10 and thus the mirror assembly 11 on the vehicle. Of course, the particular location of the mounting holes relative to the fender and frame member can vary depending on the components in the engine bay, and the desired amount of clearance to install the mirror mount on the vehicle.

To assemble the mirror mount 10 of the current embodiment, a user can join the mirror 12 with the support arm 30. The support arm 30 can be joined with the mounting element 33, and further secured to the base 20. The base 20 can be pre-manufactured to include integral pillars 40. Optionally, in some constructions, the pillars 40 can be connected to the base or otherwise brought into abutment with the base. A user can predrill holes 14H and 3H in the respective fender 14 and frame member 2. As mentioned above, the user can drill holes of different diameters H1 and H2 in the respective fender 14 and frame member 2. Optionally, the user can use a template that is provided with the mirror mount 10 to predrill the holes. The template generally can assist the installer in drilling the holes accurately and consistently from vehicle to vehicle and to ensure that the installer does not damage any components within the fender and/or engine bay.

The user can install the pillars 40 through the holes 14H and engage the second end 42 of the pillar in abutment with the upright wall 3 of the frame member 2. Optionally, this can result in the pillars 40 being generally orthogonal or perpendicular to the wall 3. With the pillars installed through the holes 14H and abutting the frame member 2, the user can install the fasteners 50 through the bores 44 in the pillars. The user can further install the nuts 53 on the opposing ends of the fasteners 50 and tighten them to rigidly and securely attach the mirror mount 10 to the frame member.

Figure 6:
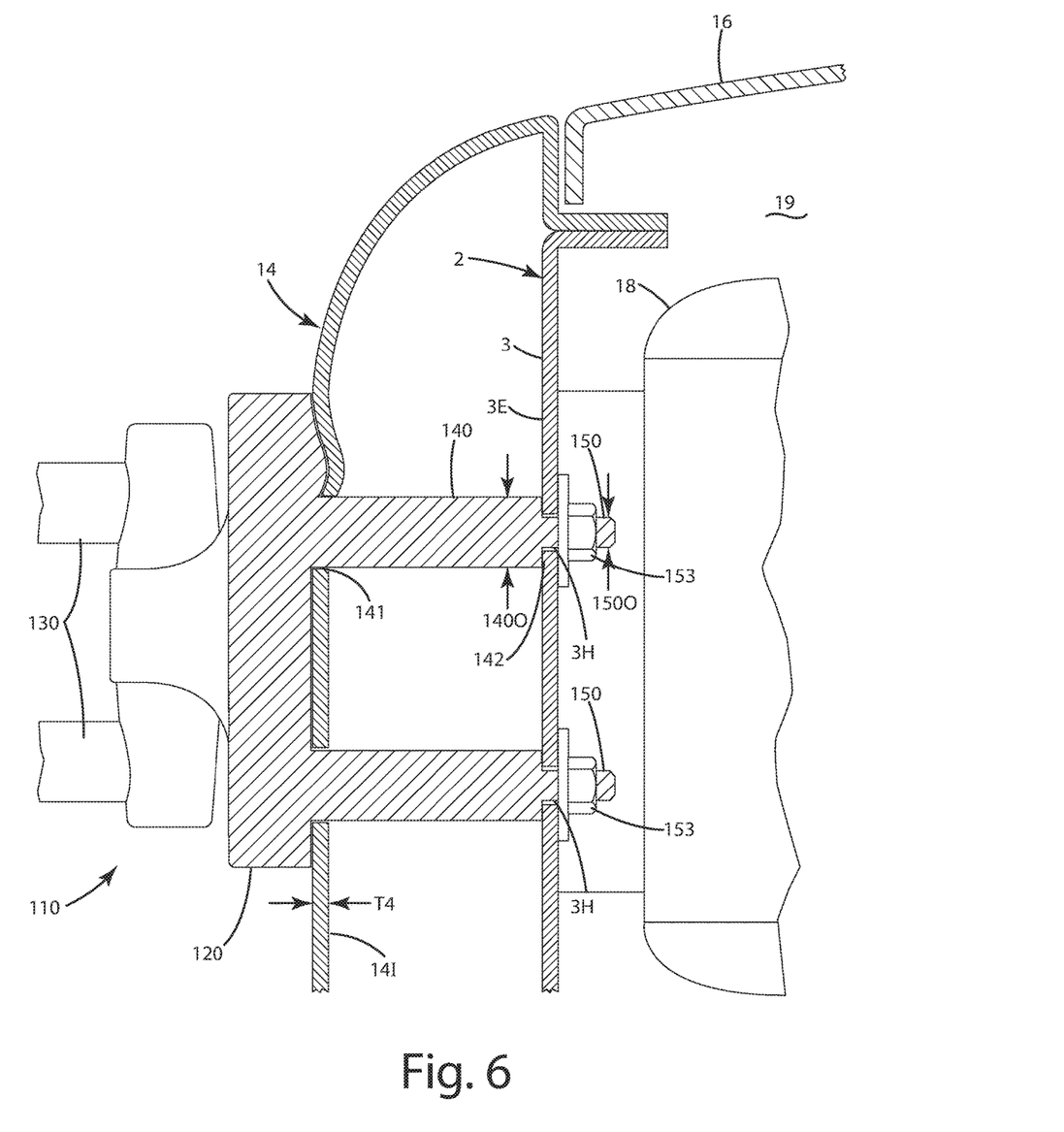
FIG. 6 is a partial section view of a first alternative embodiment of the mirror mount.

FIG. 6 illustrates a first alternative embodiment of the mirror mount 110 and mirror assembly 11 in general. This embodiment is similar to the embodiment above with a few exceptions. For example, the mirror mount 110 includes a base 120 that mounts with pillars 140 to the frame member 2. In this construction, however, the pillars 140 are of a solid piece construction, and do not define bores extending therethrough to accommodate fasteners therethrough. The pillars 140 can be integrally and monolithically formed with the base 120 to form a single piece structure, and joined at the first end 141 with the base. The pillars can extend outwardly a preselected distance from the base. This preselected distance can correspond to a distance equal to the distance between the fender interior 14I and the frame, plus the thickness T4 of the fender. Optionally, this distance can enable the base 120 to slightly clampingly engage the fender 14. Further optionally, pillars can be of a cylindrical shape, however, other polygonal shapes can be selected as desired.

The second end 142 can be configured to include a shoulder 145. The shoulder 145 can be positioned adjacent a fastener 150 that is integrally formed with the pillar 140. This fastener 150 can be threaded. The fastener 150 also can be surrounded annularly by the shoulder 145. The shoulder 145 can transition inward from the outer surface dimension 140O of the pillar 140 down to the smaller outer surface dimension 150O of the fastener 150. The shoulder 145 can abut the exterior 3E around the hole 3H of the outer wall 3 of the frame member 2. Generally, the fastener 150 can extend through the frame member 2 so that a nut 153 can be tightened on the fastener 150 to secure the base 120 and the mirror mount 110 in general to the frame member 2 adjacent the fender 14, optionally, without pulling the fender 14 so much that the tightening dents or permanently deforms the fender.

Figure 7:
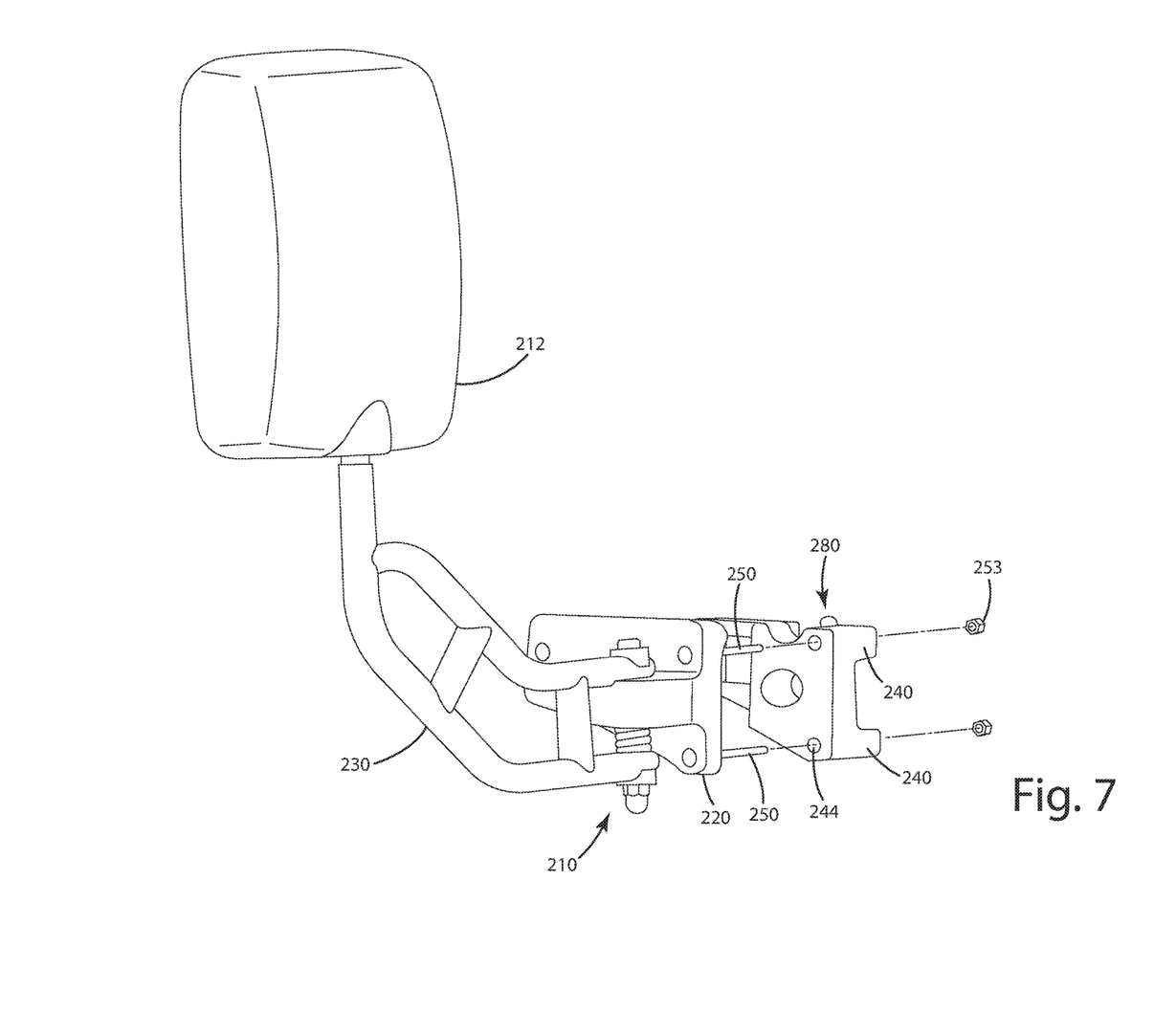
FIG. 7 is a front perspective, exploded view of a second alternative embodiment of the mirror mount.
Figure 8:
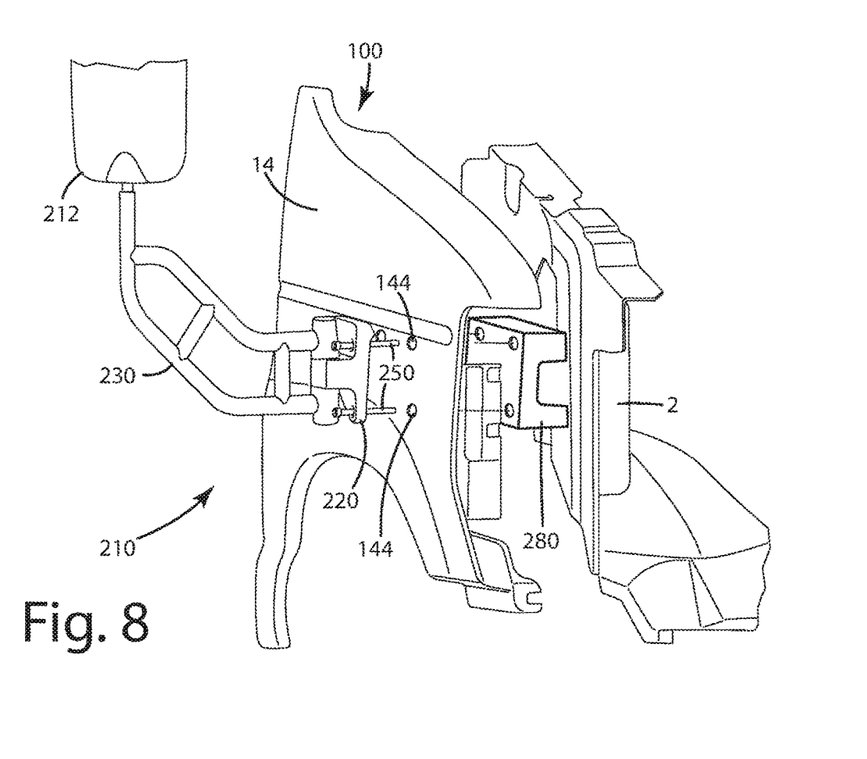
FIG. 8 is a front perspective, exploded view of the second alternative embodiment of the mirror mount as it is installed on the vehicle fender.
Figure 9:
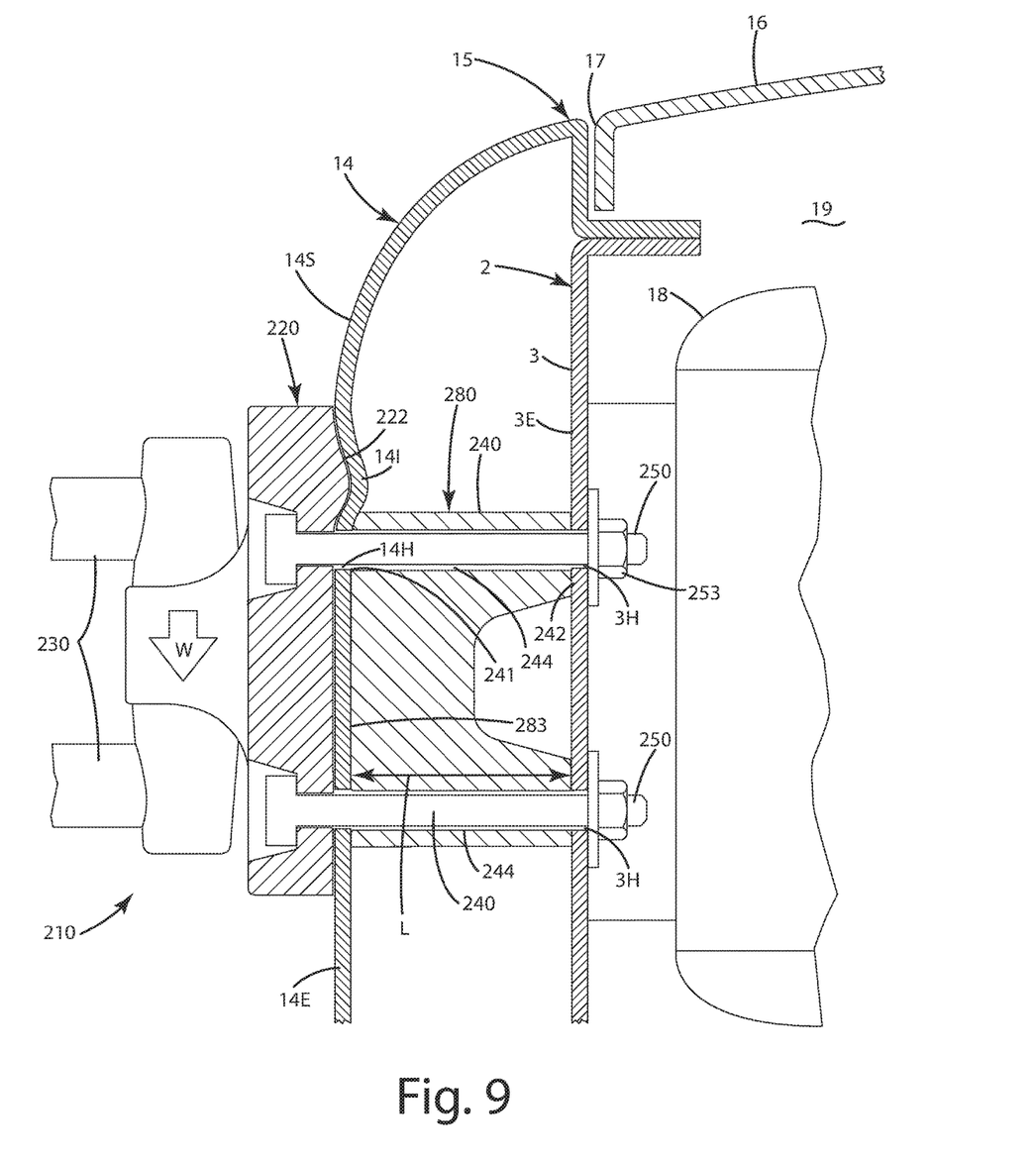
FIG. 9 is a partial section view of the second alternative embodiment of the mirror mount mounted to the fender.

A second alternative embodiment of the mirror mount 210 is generally shown in FIGS. 7-9. This embodiment is similar to the embodiments above with several exceptions. For example, the mirror mount 210 includes a base 220 and a support block 280. The support block 280 includes the pillars 240 as part of its structure. Optionally, the pillars 240 can be integrally and monolithically formed as a single piece structure with the support block 280. The support block 280 and the base 220 can be two separately constructed, independent elements, joined when the mirror mount is installed on the fender, with the fender being disposed therebetween.

When installed on a fender 14 as shown in FIGS. 8 and 9, the support block 280 is disposed between the frame member 2 (and optionally the outer wall 3) and the interior surface 14I of the fender 14. The support block 280 can be positioned between the outer upright surface of the frame member 3E and extend to the inner surface 14I of the fender 14. The support block outer surface 283 can directly engage and abut against the fender interior inner surface 14I. The respective pillars 240 including the second ends 242 can abut and contact the outer upright surface 3E of the outer wall 3 and frame member 2.

The fasteners 250 can be positioned in the bores 244 defined by the pillars 240 and optionally the support block 280. The fasteners 250 can further extend through the respective holes 14H of the fender 14 and the holes 3H of the frame member 2, similar to those of the embodiments above. The support block, however, is generally positioned in place by installing it through a lower portion of the fender 14 rather than through the holes 14H like the pillars 40, 140 of the other embodiments above. The pillars 240 included in this support block 280 can all be connected with one another. Although shown as having some structural differentiation, the pillars 240 alternatively can be formed simply as portions of the support block 280 with bores 244 strategically and specifically extending therethrough to accommodate respective fasteners.

In this construction, the support block 280 and the respective pillars 240 are configured to transfer forces created by the weight W of the respective components through the base 220 to the support block 280 and then to the frame member 2. Due to the disconnect between the support block 280 and the base 220, however, in some cases the fender 14 and in particular the side surface 14S can have forces transferred directly to and through it, from the base to the fender, to the support block. Further, in this construction, the fender 14 is sandwiched and clamped between the inner surface 222 of the base 220 and the outer surface 283 of the support block. The amount of clamping is dictated by how tight the fasteners 250 are fastened and/or tightened, as well as the overall length L of the support block. This length L can be of a preselected distance that is equal to or slightly greater or lesser than the distance between the inner fender surface 14I and the frame exterior 3E. When slightly less, the base 220 can further clampingly engage the fender and draw it closer to the frame 2—but optionally not so close that is dents or deforms the fender.

All patents, patent applications, and literature references cited in this specification are hereby incorporated herein by reference in their entirety. In case of conflict, the present description, including definitions, will control.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular. Any reference to claim elements as "at least one of X, Y and Z" is meant to include any one of X, Y or Z individually, and any combination of X, Y and Z, for example, X, Y, Z; X, Y; X, Z ; and Y, Z.

The embodiments of the invention in which an exclusive property or privilege is claimed are defined as follows:

1. A method of installing a mirror mount to a fender of a vehicle comprising:
 positioning a base adjacent a fender exterior side surface without extending the base upwardly over a fender upper edge and without extending the base adjacent an edge of a hood of the vehicle, so that a base inner surface contour terminates short of the fender upper edge, and so the base is forward of a door of the vehicle;
 orienting a support arm to extend outward from the base and so that a distal end can be fastened to a mirror;
 extending a plurality of pillars away from the base inner surface contour directly toward a portion of a bulkhead adjacent an engine bay of the vehicle, the pillars configured to engage the portion of the bulkhead at an orthogonal orientation relative to the portion of the bulkhead so that the pillars are oriented generally horizontal, and so that the pillars project toward the engine bay when the base is installed relative to the vehicle and fender; and
 positioning a fastener through the portion of the bulkhead so the fastener projects into the engine bay, the fastener securing the base to the portion of the bulkhead.

2. The method of claim 1, comprising adjusting the fastener so that the fender is positioned between the base inner surface contour and the frame member.

3. The method of claim 1,
wherein the pillars include a first end joined with the base and a second end distal from the first end, and comprising:
separating the first end and the second end from one another a first distance equal to a second distance defined between the fender and an outer upright surface of the portion of the bulkhead.

4. The method of claim 1 comprising positioning the pillars so the pillars extend from adjacent the fender toward an outer upright surface of the portion of the bulkhead above a wheel well of the vehicle.

5. The method of claim 1,
wherein the plurality of pillars each define a bore, comprising:
extending the fastener through each of the bores.

6. The method of claim 5,
wherein the base includes at least one seat, comprising:
disposing a head of the fastener in the seat so that the seat engages the fastener to prevent rotation of the fastener, and so that the head is visible in the seat to a viewer of the base installed on the vehicle.

7. The method of claim 1 comprising adjusting a mirror on the support arm.

8. The method of claim 1 comprising:
installing a nut on the fastener inside the engine bay; and
tightening the nut, with the pillars limiting movement of the base toward the portion of the bulkhead, whereby the pillars prevent the fender from being at least one of crushed, dented, and permanently deformed if the nut is over-tightened.

9. The method of claim 1 comprising:
drilling a hole in the fender;
drilling a hole in the portion of the bulkhead; and
inserting the fastener through the hole in the fender and the hold in the bulkhead.

10. The method of claim 1 comprising:
disposing the fastener in a pillar of the plurality of pillars, between the vehicle fender and the portion of the bulkhead.

11. The method of claim 1 comprising extending the fastener through a hole defined by the portion of the bulkhead so that the fastener extends into the engine bay.

12. The method of claim 1 comprising threading a nut on the fastener projecting through a hole defined by the portion of the bulkhead so that when the nut is tightened, the pillar and the base are rigidly secured to the portion of the bulkhead, wherein the nut is located in the engine bay when threaded on the fastener.

13. The method of claim 1 comprising:
placing a template adjacent the fender exterior side surface;
drilling holes in the fender based on the placement of template holes defined by the template.

14. The method of claim 1 comprising placing the base above a wheel well defined by the fender.

15. The method of claim 1 comprising extending the fastener into the engine bay adjacent an air conditioning tank of the vehicle located inside the engine bay.

16. A method of mounting a mirror to a fender of a vehicle comprising:
positioning a base adjacent a fender exterior side surface of a vehicle fender without extending the base upwardly to an edge of a hood of the vehicle, the base including a base upper end that terminates below an uppermost part of the fender, extending a support arm from the base and to a distal end adapted to join a mirror;
extending a pillar away from the base toward an engine bay of the vehicle, the pillar sized and shaped to extend through a hole defined by the fender without engaging an interior surface of the fender, the pillar of a preselected length so that the pillar extends toward a hole in a bulkhead adjacent the engine bay, the bulkhead being disposed inwardly relative to the fender;
projecting a fastener associated with the pillar through the hole in the bulkhead so that a weight of the mirror, the base, the support arm and the pillar are substantially born by the bulkhead,
whereby vibration inherent in the fender is reduced from being transmitted to the mirror, and
whereby the mirror is generally rigidly connected to the bulkhead.

17. The method of claim 16 comprising registering an interior contour including a projection with an exterior contour of the fender in a preselected location on the exterior of the fender forward of a door of the vehicle.

18. The method of claim 16 comprising threading a nut on the fastener inside the engine bay.

19. The method of claim 18, comprising:
limiting with the pillar movement of the base toward the bulkhead, whereby the pillar prevents the fender from being at least one of crushed, dented, and permanently deformed if the nut is over-tightened.

20. The method of claim 16 comprising:
drilling a first hole through the fender and a second hole through the bulkhead of the engine bay; and
installing the fastener through the first hole and the second hole.

* * * * *